June 13, 1944.  G. W. YOUNKMAN  2,351,177
NONSPILL VENT PLUG FOR BATTERIES
Filed Dec. 16, 1942  2 Sheets-Sheet 1

George W. Younkman
INVENTOR

BY *[signature]*
ATTORNEY

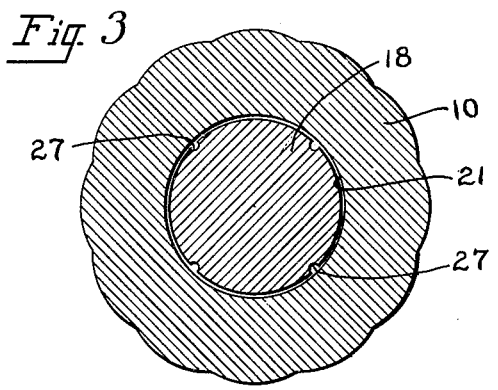
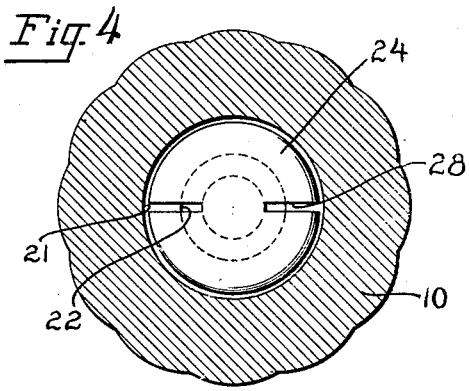
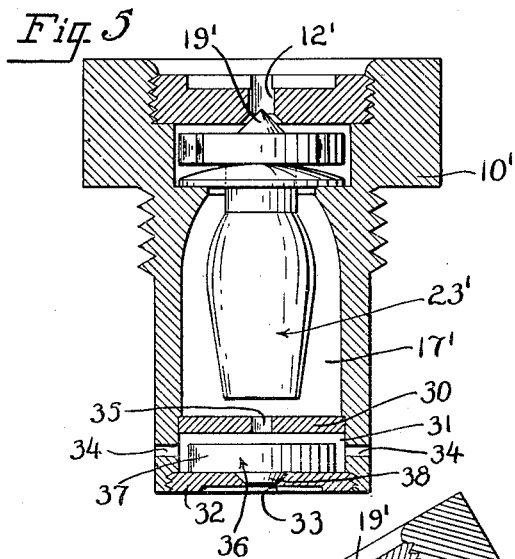
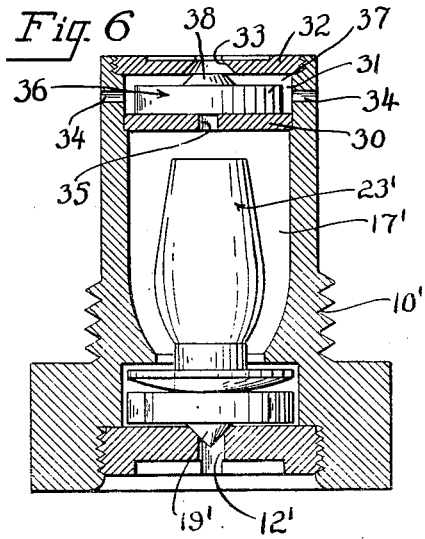
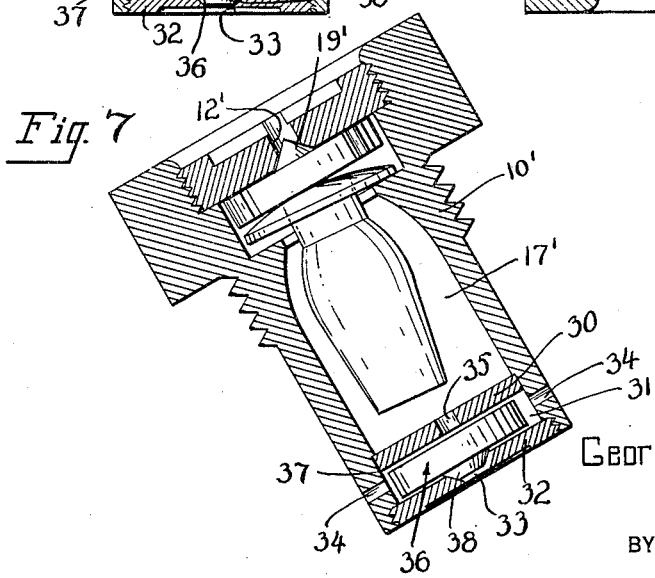

Patented June 13, 1944

2,351,177

UNITED STATES PATENT OFFICE 2,351,177

NONSPILL VENT PLUG FOR BATTERIES

George W. Younkman, Jersey City, N. J.

Application December 16, 1942, Serial No. 469,205

2 Claims. (Cl. 277—70)

This invention relates to storage batteries and more particularly to a non-spill vent plug for such batteries.

It is common practice in the construction of storage batteries to provide vent openings in the closure plugs for the fill openings of the battery, to allow the escape of gas which is generated in the battery. So long as the battery remains in upright position this arrangement has proven satisfactory, but with varied new conditions met with in the use of batteries, the battery often tilts or is even turned over, allowing acid to leak from the vents in the plug and destroys surrounding mechanism or causes excessive corrosion of the battery terminals or connections.

It is an object of the present invention to provide a closure plug for the fill openings of batteries which will permit proper and necessary venting to atmosphere of gases formed in the battery, but which will prevent the leaking of acid from the vents when the battery is tilted, turned over, or during a rolling motion of the carrier on which the battery is mounted such as the rolling motion of a small ship, airplane or the like.

With these and other objects in view, as may appear from the accompanying specification, the invention consists of various features of construction and combination of parts, which will be first described in connection with the accompanying drawings, showing a non-spill vent plug for batteries of the preferred form embodying the invention, and the features forming the invention will be specifically pointed out in the claims.

In the drawings

Figure 3 is a horizontal detailed section taken on the line 3—3 of Figure 1.

Figure 4 is a horizontal detailed section taken on the line 4—4 of Figure 1.

Figure 5 is a vertical section through a modified form of the non-spill closure plug showing it in upright position.

Figure 6 is a view similar to Figure 5 showing the plug in a reversed or upside down position.

Figure 7 is a longitudinal section through the modified form of the plug showing it in detailed position.

Referring more particularly to the drawings, a part of an ordinary type of storage battery casing is illustrated at 1 which has the usual type of threaded filling opening 2 therein by means of which water and acid are put into the storage battery casing about the plates indicated at 3. During use of a storage battery, gas generates therein which must be vented to the atmosphere, and it has been the general practice heretofore to provide vent openings in the closure plugs for the fill openings 2 to allow for the escape of such gas. This is satisfactory except in instances where the battery is tilted, turned upside down or the like and at such times the acid leaks out through the vent openings causing excessive corrosion of the terminals and connection of the batteries, and in some instances destroying surrounding mechanism with which the battery is associated, this may occur in cases where storage batteries are used in small ships, in airplanes, and also in the portable radio sets which are carried by small warships of the Coast Guard type or the like. It is the practice when such ships are sunk or damaged for the crew to throw the radio set overboard and subsequently pick it up for sending messages, and at such times the set being subjected to the action of the waves tilts, turns over, etc.

The present invention comprehends a closure plug which will permit the venting of the gas from the battery casing when the battery is in its normal upright position, but includes means for sealing the vent openings in abnormal conditions so as to prevent the leakage of acid from the battery casing.

Figure 1:
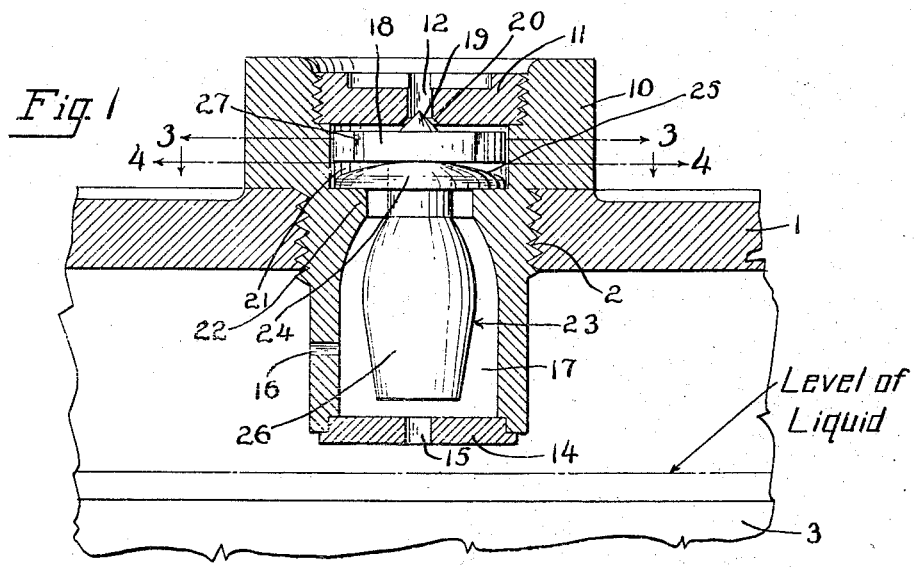
Figure 1 is a vertical section through the improved non-spill closure plug showing it in upright position.
Figure 2:
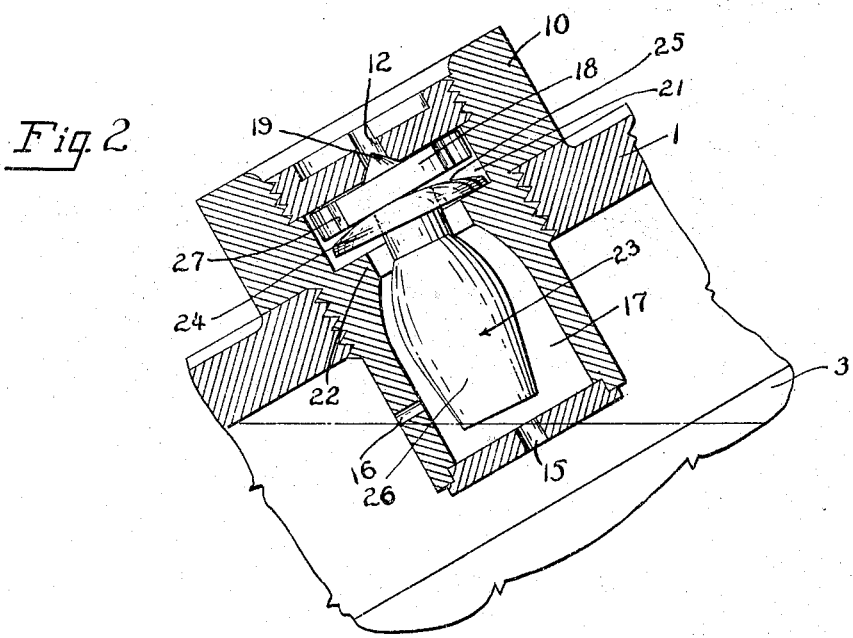
Figure 2 is a vertical cross-section through the plug showing it in tilted position.

The improved closure plug 10 is hollow having the outer end of its hollow bore closed by a removable closure plug 11. The closure plug 11 has a vent opening 12 therein which opens from the bore of the plug 10 to atmosphere. The bottom 14 of the plug may be removable as shown in Figures 1 and 2 of the drawings, and the bottom 14 is provided with a vent opening 15. The side wall of the plug 10 is also provided with a vent opening 16 so as to allow gas to enter the bore 17 of the plug 10 through the openings 15 and 16 and escape through the vent opening 12.

A valve structure is provided for closing the vent opening 12, and this valve structure comprises a flat valve plate 18 which has a conical valve member 19 formed on its outer face which conical valve 19 cooperates with a valve seat 20 formed at the inner end of the vent 12. The valve disc 18 is positioned within a compartment 21 formed in the bore 17 of the plug 10 by the annular flange 22. A valve seating member 23 is carried by the plug 10 within the bore thereof and it has a flat head 24, the under surface of which rests upon the upper or outer surface of the annular flange 22. The outer surface of the flat head 24 is convex curved as shown at 25 and engages the inner flat surface of the valve disc 18. A weighted pendant 26 is connected to the head 24, is dependent therefrom, and located in the bore 17 of the plug 10. The pendant 26 is weighted or is of sufficient weight to rock the head 24 and force the valve disc 18 outwardly causing the valve cone 19 to seat against the valve seat 20 and close the vent 12 when the battery is tilted in either direction from its upright position. Such a tilted position is shown in Figure 2 of the drawings.

The valve disc 18 is provided with a plurality of circumferentially spaced grooves 27 in its perimeter, and the head 24 is provided with suitable slots 28. The grooves 27 and slots 28 permit the gas to pass through the hollow body of the plug 10 to the vent opening 12 and thence to atmosphere when the valve cone 19 is off the valve seat 20.

The bore 17 of the valve plug 10 is of sufficient size in relation to the size of the pendant 26 to permit this pendant and its attached head to swing freely upon tilting movement of the battery so as to close the vent 12 at all times when the battery is in an abnormal position.

In Figures 5 to 7 inclusive of drawings, a modified form of the invention is shown wherein a safety valve structure is embodied in the plug structure 10' in addition to the vent closing valve 19' and its operating member 23'. It is understood of course, that the valve structure 19' and its operating member 23' are the same in the modified form of the plug as in the preferred form shown in Figures 1 to 4 and the operation is identical.

In the modified form a partition 30 extends across the interior of the hollow plug 10' a short distance inwardly from the inner end of the plug forming a compartment 31. The inner end 32 of the plug is removably attached to the plug body and is provided with a vent opening 33 to allow gas from the battery to enter the compartment 31. The plug body 10' is also provided with vent openings 34 in its side walls which open into the compartment or chamber 31. The partition 30 is provided with a vent opening 35 which permits the gas to pass from the compartment or chamber 31 into the main bore 17' of the plug and from thence out to atmosphere through the vent opening 12'. A valve member 36 is positioned in the compartment 31 and comprises a valve disc 37 having a conical valve member 38 formed thereon which forms a closure for the vent opening 33 when the valved plug is in its normal upright position. When the plug 10' is tilted, as for instance is shown in Figure 7 of the drawings, the valve member 36 will shift so as to close the vent 35 in the lower side of the plug and retard the leakage of acid into the compartment 31. The valve disc 37 will also in many instances serve to close the vent 35 when the valved plug is tilted. In the event the battery is turned upside down and the closure plug 10' is likewise turned upside down the various parts assume the positions shown in Figure 6 of the drawings with the valve cone 19' closing the vent opening 12' and the valve disc 37 closing the vent opening 35 thus effectively preventing the leakage of acid from the battery.

It will be understood that the invention is not to be limited to the specific construction or arrangement of parts shown, but that they may be widely modified within the invention defined by the claims.

What is claimed is:

1. In a storage battery having a casing provided with a filling opening, a plug for closing said opening, said plug being hollow and having communication with said casing and provided with a vent for releasing gases generated in the casing to the atmosphere, a shoulder in said plug beneath said vent, a valve means for closing said vent, a swingable member having a head resting on said shoulder and engaging beneath said valve means to normally support the valve means in a venting position, said swingable member depending from said shoulder and rocking said head on the shoulder when the battery is tilted from the vertical to shift said valve means to a vent closing position, said head being provided with means for passing gases therethrough, first and second spaced walls at the lower end of said plug, said plug being provided with passage means communicating with the space between said first and second walls, said first wall having a vent opening communicating with the interior of said plug, a gravity responsive body in the space between said first and second walls and having a face engageable with said first wall to close the vent opening therein, and coacting means on said gravity responsive body and said second wall for shifting said gravity responsive body into engagement with the first wall to close the vent opening therein when the battery is tilted from the vertical.

2. In a storage battery having a casing provided with a filling opening, a plug for closing said opening, said plug being hollow and having communication with said casing and provided with a vent for releasing gases generated in the casing to the atmosphere, an annular shoulder in said plug and beneath said vent, a valve body in the nature of a disc fitting loosely in said plug and provided with a valve element for closing said vent, and a swingable member having an annular head resting on said shoulder and provided with a convex surface engaging said valve body to normally support the valve element in a venting position, said valve body and said head being provided with passages for gases escaping through said vent, said swingable member depending from said shoulder and rocking said head on said shoulder when the battery is tilted from the vertical to shift said valve body and bring said valve element to a vent closing position, first and second spaced walls at the lower end of said plug, said plug being provided with passage means communicating with the space between said first and second walls, said first wall having a vent opening communicating with the interior of said plug, a gravity responsive body in the space between said first and second walls and having a face engageable with said first wall to close the vent opening therein, and coacting means on said gravity responsive body and said second wall for shifting said gravity responsive body into engagement with the first wall to close the vent opening therein when the battery is tilted from the vertical.

GEORGE W. YOUNKMAN.